(12) United States Patent
Heracles et al.

(10) Patent No.: US 8,593,272 B2
(45) Date of Patent: Nov. 26, 2013

(54) BEHAVIOR-BASED LEARNING OF VISUAL CHARACTERISTICS FROM REAL-WORLD TRAFFIC SCENES FOR DRIVER ASSISTANCE SYSTEMS

(75) Inventors: Martin Heracles, Obertshausen (DE); Benjamin Dittes, Frankfurt (DE)

(73) Assignee: Honda Research Institute Europe GmbH, Offenbach/Main (DE)

( * ) Notice: Subject to any disclaimer, the term of this patent is extended or adjusted under 35 U.S.C. 154(b) by 342 days.

(21) Appl. No.: 12/911,777

(22) Filed: Oct. 26, 2010

(65) Prior Publication Data

US 2011/0095879 A1  Apr. 28, 2011

(30) Foreign Application Priority Data

Oct. 28, 2009  (EP) ..................................... 09174341

(51) Int. Cl.
*B60Q 1/00* (2006.01)
(52) U.S. Cl.
USPC .............................. 340/441; 382/104; 701/23
(58) Field of Classification Search
USPC .......... 340/441, 425.5, 576; 382/104; 701/23, 701/28
See application file for complete search history.

(56) References Cited

U.S. PATENT DOCUMENTS

| | | | |
|---|---|---|---|
| 5,684,697 A | 11/1997 | Mullen | |
| 6,278,918 B1 * | 8/2001 | Dickson et al. | 701/23 |
| 6,370,471 B1 | 4/2002 | Lohner et al. | |
| 7,583,816 B2 * | 9/2009 | Kakinami et al. | 382/104 |
| 2004/0252027 A1 | 12/2004 | Torkkola et al. | |

FOREIGN PATENT DOCUMENTS

| | | |
|---|---|---|
| CN | 1218355 A | 6/1999 |
| DE | 19648826 A1 | 6/1997 |
| EP | 2077212 A1 | 7/2009 |
| GB | 2394076 A | 4/2004 |
| JP | 6270780 A | 9/1994 |
| JP | 10100820 A | 4/1998 |
| JP | 10264795 A | 10/1998 |
| JP | 2005231450 A | 9/2005 |
| JP | 2007004669 A | 1/2007 |
| JP | 2007018142 A | 1/2007 |
| JP | 2008044520 A | 2/2008 |
| JP | 2009-51430 A | 3/2009 |
| JP | 2009-96365 A | 5/2009 |
| KR | 1020050006760 A | 1/2005 |
| WO | 01/95141 | 12/2001 |
| WO | 2004/021546 A2 | 3/2004 |

OTHER PUBLICATIONS

European Communication, Mar. 31, 2010, European Search Report dated Mar. 12, 2010, EP 09 17 4341, a total of 10 pages.
Joel McCall et al., "Human Behavior Based Predictive Brake Assistance" Intelligent Vehicles Symposium 2006, Jun. 13-15, 2006, Tokyo, Japan, pp. 8-12.

(Continued)

*Primary Examiner* — John A Tweel, Jr.
(74) *Attorney, Agent, or Firm* — Squire Sanders (US) LLP

(57) ABSTRACT

A computer-implemented method for setting-up and operating a driver assistance system, the method comprising the steps of:
  visually sensing the environment of a vehicle,
  sensing at least one rate of change of a parameter representing a status of the car, which parameter can be influenced by a driver manipulating a man/machine interface of the vehicle,
  structuring information gathered by the visual sensing by classifying the at least one sensed rate of change in different categories, in order to find visual features associated to a certain category of sensed rate of change and thus associated with a certain behavior of the driver.

11 Claims, 5 Drawing Sheets

(56) References Cited

OTHER PUBLICATIONS

Jens Schmuedderich et al., "Organizing Multimodal Perception for Autonomous Learning and Interactive Systems", 2008 8th IEEE-RAS International Conference on Humanoid Robots, pp. 312-319.

Michael Krodel, "Autonome Optimierung des Cerhaltens von Fahrzeugsteuerungen auf der Basis von Verstarkungslernen", May 30, 2006, Universitat Siegen, a total 30 pages.

Michael Krodel et al., "Towards a Learning autonomous Driver System", Oct. 28, 2000, a total of 6 pages.

Uwe Handmann et al., "Analysis of Dynamics Scenes", International Archives of Ptotogrammetry and Remote Sensing, vol. XXXIII, 2000, pp. 347-354.

Japanese Office Action dated Jun. 26, 2012, for corresponding JP Application. No. 2010-237128 (now JP Patent No. 5132750, issued on Nov. 16, 2012).

* cited by examiner

BEHAVIOR-BASED LEARNING OF VISUAL CHARACTERISTICS FROM REAL-WORLD TRAFFIC SCENES FOR DRIVER ASSISTANCE SYSTEMS

BACKGROUND OF THE INVENTION

In a broad sense, the invention is settled in the areas of computer vision and machine learning. The intended domain of application consists in realistic real-world traffic environments, such as encountered when driving a car in an unconstrained inner-city scenario, for example.

The invention can be implemented in a vision-sensor based computing module, which can be part of a car, motorbike, boat, plane or any other sea, land or air vehicle having a human "driver".

"Behavior" in the context of the present invention has to be understood as a driver's behavior, detected via a driver-induced change of state of the vehicle, as sensed by internal or external sensors of the vehicle. The driver-induced change of state of the vehicle can also be estimated without internal sensing (e.g. transmitted via a CAN bus). For example, it can be obtained by computing the ego-motion of the vehicle based on the optical flow, which only requires the camera data.

STATE OF THE ART

There are many systems for driver assistance and autonomous driving that focus on specific tasks and are tailored towards these by design. In the following, some known approaches will be briefly presented and it will be described which task they focus on, which sensors they use, what information they process and how the proposed invention differs from them.

Some of the existing systems, e.g., [1], can be described as lane departure warning or lane keeping systems. While there are differences with respect to the sensors that are being used in order to detect the lanes, e.g., cameras and GPS with map data in the case of [1], they have in common that they concentrate on the extraction and processing of information about the lane markings in the scene. This information is then compared to the actual position or driving path of the car and, if deviating significantly, either a warning is provided to the driver or the system autonomously corrects the driving path of the car by controlling the steering angle.

In contrast thereto, the system according to the invention is designed to learn that the car is typically in between lane markings while driving, as opposed to crossing them, which also occurs from time to time but is much more infrequent. Thus, it can provide a warning signal to the driver whenever this is not the case. Since the system also learns that the driver actively maintains this state by corrective steering behavior, the system can even perform such steering behavior autonomously in such cases. However, this is only part of the capabilities of the system according to the invention, since it is not restricted to the processing of lane markings and not limited to autonomous steering behavior. For example, it also considers behaviors such as braking and accelerating. In contrast to [1], in particular, the system according to the invention only requires a visual sensor (camera), without GPS or map data.

Many existing systems, e.g., [2], [3], [4], [5], [6], [7], [8], [9] and [10], monitor the area in front of their own car in order to detect other vehicles, or obstacles in general, e.g., [11]. The sensors being used range from cameras over laser and ultrasonic radar to infrared cameras. These systems have in common that they typically focus on the relative speed or distance of vehicles in front of their own car in order to prevent a collision. Thus, they provide a warning signal to the driver that he/she should brake or they autonomously brake by controlling the effectors of the car if the relative speed or distance becomes critical.

Since the invention also proposes, as an option, to include disparity as one of the visual cues being considered, such as obtained by a stereo camera, for example, the system according to this aspect of the invention is able to learn that the driver typically keeps the distance to vehicles in front of their own car within a certain range. In particular, it learns that the driver typically brakes when the disparity values in front of their own car become too large, i.e., when something is getting too close to their own car. Thus, our system can also provide a warning to the driver that he/she should brake whenever such a situation occurs, or even initiate the braking autonomously by controlling the effectors of the car. The main difference, however, is that our system can also learn that braking is appropriate as a reaction to things that are not obstacles, such as red traffic lights, for example. In contrast to [4], in particular, the invention in this aspect does not require that signal-emitting devices are mounted on other vehicles or parts of the scene, and we only use cameras as sensors.

Other existing systems are combinations of these two types of systems, focusing on the detection of both lane markings and obstacles in front of the vehicle, e.g., [12] and [13]. They use cameras as sensors, and their systems autonomously control the steering angle as well as the velocity of the car such that it keeps the lane and does not collide with other vehicles. Reference [13] also considers autonomous acceleration, which enables the car to autonomously follow another car in front. Nevertheless, these systems have similar limitations like the systems mentioned earlier in that they are not capable of reacting to non-obstacles. The invention, in contrast, in one aspect proposes to learn to brake or accelerate depending on whether a traffic light turns red or green, for example. Generally, a system according to the invention has the capacity to learn various causes for the different behaviors at the same time.

Finally, systems have been proposed that focus on a variety of different aspects of the scene, e.g., [14] and [15]. The range includes lanes, other vehicles, ground markers and road signs, for example, and is obtained by analyzing stereo or 3D camera images. The systems autonomously control both steering angle and velocity in order to react appropriately to them. While these systems seem to have similar capabilities like our system in that they are not restricted to certain types of objects only, the invention in one aspect employs a very different method in order to achieve these capabilities, namely, it learns them directly from real-world traffic environments like the ones in which it operates afterwards. In contrast to the systems in which the designers define a range of specific tasks or objects of interest and what is the relevant information for each of them, our system learns all the relevant information by itself and, hence, can be expected to also react properly in situations that the designers did not consider, including better robustness to the considerable variance of the data encountered during real-world operation.

OBJECT OF THE INVENTION

The invention proposes an approach for a more efficient scene analysis of a vision based driver assistance system.

This object is achieved by means of the features of the independent claims. The dependent claims develop further the central idea of the present invention.

One aspect of the invention relates to a computer-implemented method for operating a driver assistance system, said method comprising the steps of:

visually sensing the environment of a vehicle, sensing at least one rate of change of a parameter representing a status of the car, which parameter can be influenced by a driver manipulating a man/machine interface of the vehicle, structuring information gathered by the visual sensing by classifying the at least one sensed rate of change into different categories, in order to find visual features associated to a certain category of sensed rate of change and thus associated with a certain behavior of the driver.

As a function of the structured information, a visual or acoustical signal can be generated, or an effector of the vehicle, such as e.g. a steering wheel, an accelerator or a brake can be controlled by the driver assistance system.

The step of structuring may comprise:

splitting the visually sensed data stream in at least two categories of the at least one sensed rate of change, such as "turning left", "turning right" or "accelerating", preferably only in case the sensed rate of change exceeds a predefined threshold value.

One additional category may be provided for portions of the visually sensed data stream in time period during which no sensed rate of change was present or did not exceed a predefined threshold value.

The method may comprise a step of preparing a histogram indicating how frequent a visual feature out of different visual features occurred while the sensed rate of change indicated the occurrence of a category of a driver's behavior.

The invention also relates to a computing unit, designed to carry out a method according to any of the preceding claims.

The invention furthermore relates to a driver assistance system, equipped with such a computing unit, furthermore comprising visual or acoustical indicating means, and/or an interface for supplying control commands to at least one effector of the vehicle, such that the system can autonomously control the vehicle.

Further objects, features and advantages procured by the invention will become evident for the skilled person when reading the following detailed description of embodiments of the invention, when taken in conjunction with the figures of the enclosed drawings.

SUMMARY OF THE INVENTION

Figure 1:
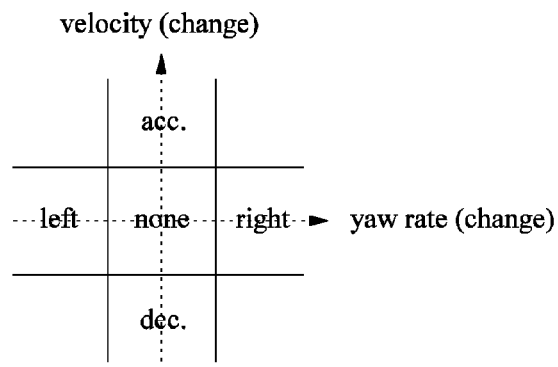
FIG. 1 shows basic types of behavior of a driver, defined by four thresholds (solid lines) and as sensed by the driver's acting on man/machine interfaces of the vehicle.

The invention is intended to benefit the domains of driver assistance systems and autonomous driving applications. In both domains, a technical system mounted on-board a car is used to monitor the surrounding environment, which is achieved by means of various sensors such as at least one camera, for example. From the raw sensor data thus acquired, the system has to extract relevant information, i.e., information that is important to know in order to be able to safely drive the car given the current environmental situation. Based on this information, the system ultimately forms expectations regarding the appropriate behavior in this situation and, depending on the domain, compares these to the actual behavior of the human driver, providing a warning signal in case of significant deviation, or the system can actively initiate the behavior it considers appropriate by controlling the effectors of the car. Lane departure warning systems and lane keeping systems, respectively, are examples of technical systems like this.

The important aspect on which the proposed invention focuses is the extraction of relevant information from the data acquired by the sensors. Despite the enormous complexity of real-world traffic environments and, as a consequence, the vast amount of information contained in the sensor data, it is clear that most of this information is of little or no relevance when it comes to driving a car in these environments and that only a very limited share of the information thus needs to be extracted and processed further. Existing systems for driver assistance or autonomous driving typically exploit this property in a rather direct way, by considering very specific individual tasks for which it is quite clear what the relevant information is. For example, lane keeping systems obviously need to extract and process information regarding the positions of lanes in the vicinity of the car, systems for collision avoidance need to monitor the distance to objects in front of the car, and so on. Therefore, it is characteristic of such systems to be fully tailored towards the specific task for which they have been designed, essentially achieving satisfactory results for this task at the expense of being unable to take into account other aspects of the scene that are not part of their design.

In contrast, the proposed invention follows a more holistic approach. Rather than focusing on a specific task and, by design, restricting the system to process only the information that is considered to be relevant for this specific task, the system according to the invention processes all available information in parallel and, over time, learns which aspects of the available information are relevant for driving in general. More exactly, the system compares all sensor information being acquired in situations in which the driver performs a certain behavior (e.g., braking, accelerating, turning left or right) to the sensor information being acquired in the absence of such behavior, focusing on the differences. The statistical significance of these differences then represents their relevance for the behavior considered. The advantage of this approach is that, once the system has learned which aspects of the sensor information are relevant for which type of behavior, it has a very sparse representation of the visual scene defined by behavior-relevance, covering a wide range of very different aspects throughout the entire scene all of which are known to be relevant for a certain type of behavior. As a consequence, the representation can be used to derive expectations about which behavior is most appropriate in a given visual scene, which can then be compared to the actual behavior of the driver or autonomously initiated by the system itself. Thus, the system is able to perform similar tasks like existing systems for driver assistance and autonomous driving without being limited to processing those few aspects of the information the designers considered important, instead, it takes into account a whole variety of aspects about the current situation for making the decision. At the same time, it is a convenient way to create such systems because they learn by themselves which aspects of the sensor information are relevant.

GENERAL SETTING OF THE INVENTION

The invention operates as follows. A technical system that is mounted on-board the vehicle (e.g. a car) observes, on the one hand, the behavior of the human driver in terms of the driver's effects on man-machine interfaces, such as e.g. interfaces (pedals, steering wheel, . . . ) affecting the velocity, steering angle and other parameters of the car and, on the other hand, observes the visual scene in front of the car.

Additionally, internal car parameters may be obtained from a (e.g. CAN) bus of the car and the visual scene in front of the car can be monitored by means of a camera (the behavior of the driver can be directly estimated from the optical flow). From these supplied signals Driver behavior, i.e. driver-triggered changes of the status of the vehicle, Optionally internal car parameters (engine revolution speed, . . . ), and Visual analysis of external world the system learns, without further supervision, which elements of the visual scene are characteristic of the different behaviors of the driver, both in terms of characteristic visual features as well as their typical locations in the visual field. For example, the system can learn—amongst others—that a significant share of the situations in which the driver brakes until the car stops is correlated with the presence of red traffic lights in the upper right area of the visual field.

DETAILS OF THE INVENTION

Figure 4:
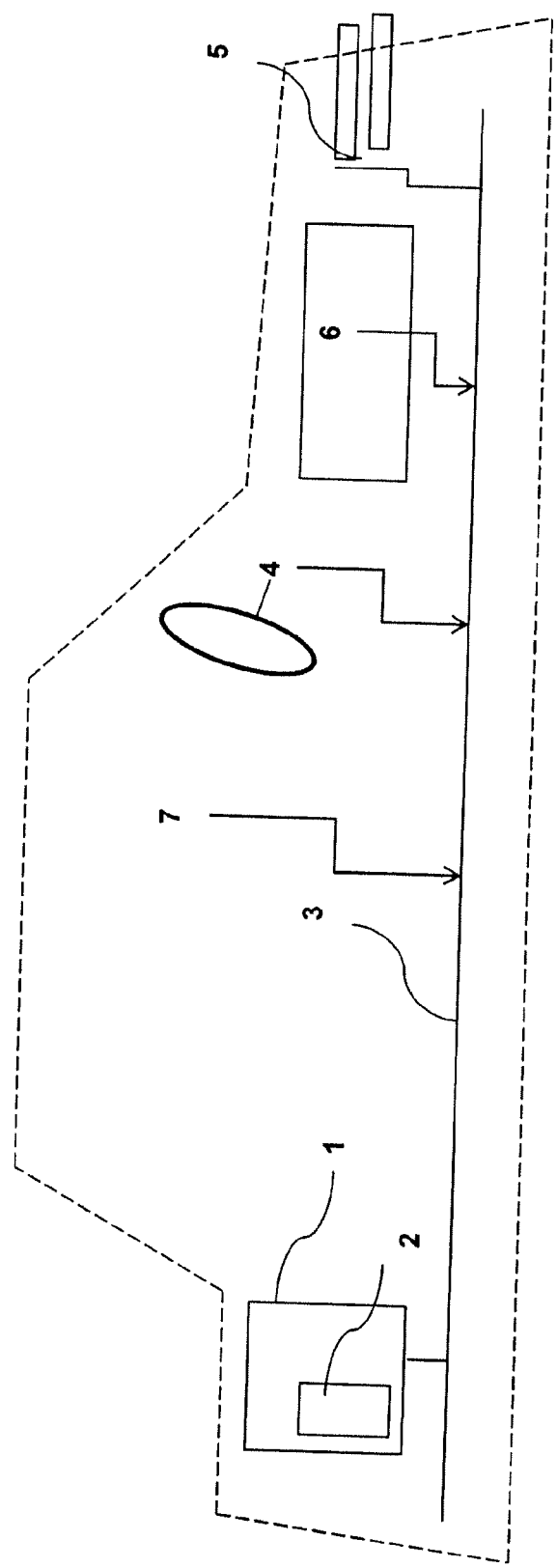
FIG. 4 shows a vehicle having a system according to the invention.

The system according to the invention as shown in FIG. 4, typically a computing unit 1 functionally connected to a memory 2, can be mounted on-board a car or other vehicle that is equipped with a bus 3 (e.g. a CAN bus) for supplying internal vehicle parameters from sensors 4, 6. Furthermore a visual sensor 5 such as e.g. a stereo camera monitors the area in front of the vehicle and supplies visual data to the computing unit.

The bus provides the computing unit with information about the current state of the car in terms of various physical properties, as sensed by sensors 6 measuring internal vehicle parameters as the engine speed, sensors 4 detecting the impact of driver's activities on man/machine interfaces of the vehicle as the steering-wheel and/or sensors 7 detecting driver's gestures. In particular its velocity and yaw rate is provided, as sensed by corresponding sensors for these rates. Velocity and yaw rate are sufficient to represent the car as a physical body, and they reflect the behavior of the driver as they are the direct result of how the driver controls the steering wheel, throttle and brake pedals of the car. The camera preferably provides the system with stereo image pairs, consisting of a left and right color image in RGB color space.

It is assumed that the bus data, the left and the right stereo image are in sync, i.e. their timestamps are the same if they correspond to the same situation. In practice, the input to the system consists of several streams of synchronized bus data and stereo image pairs, where each stream has been recorded while driving for an extended period of time in unconstrained real-world traffic environments.

Figure 5A:
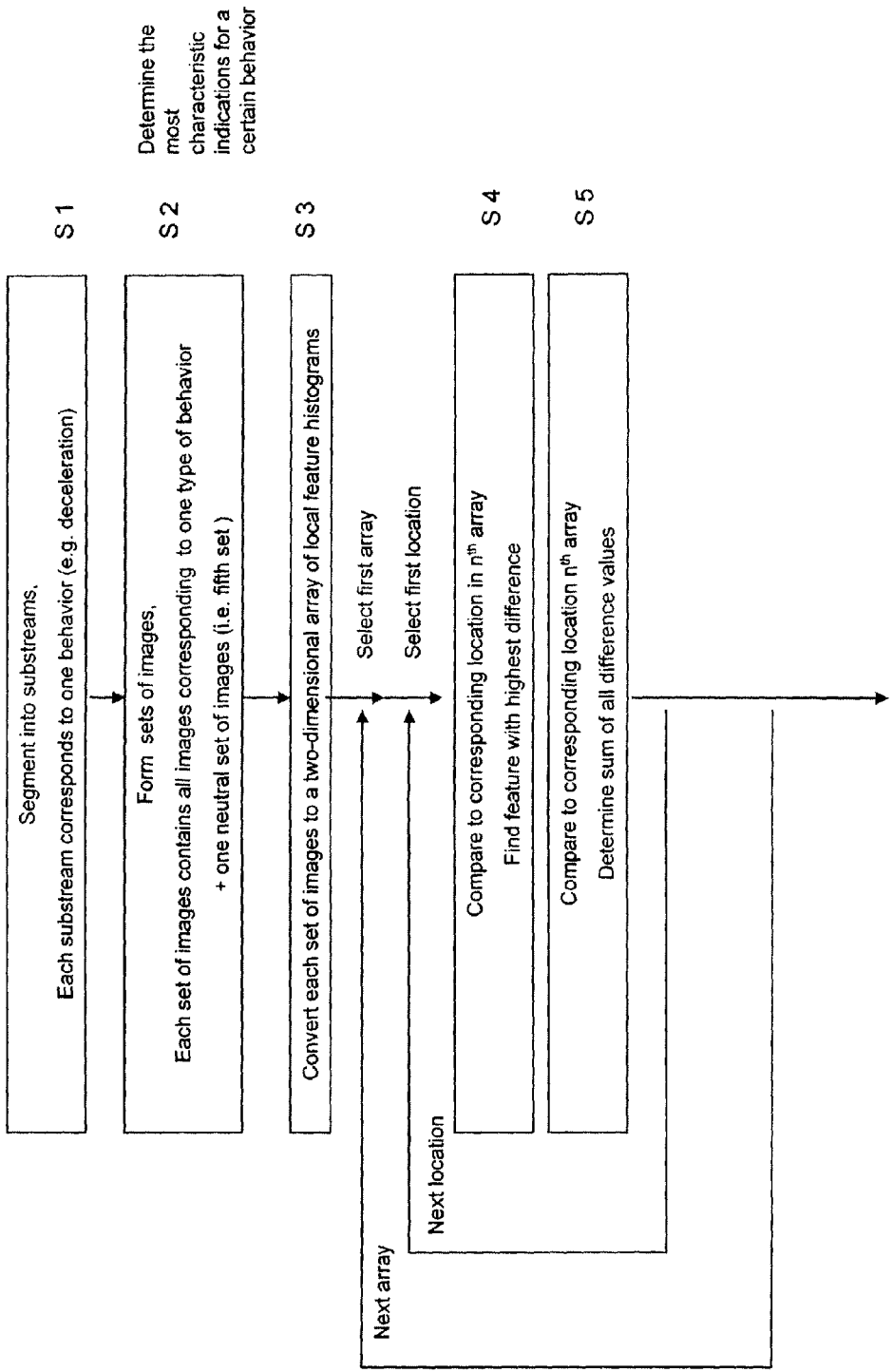
FIGS. 5a and 5b show a flowchart illustrating an example of a method of the present invention
Figure 5B:
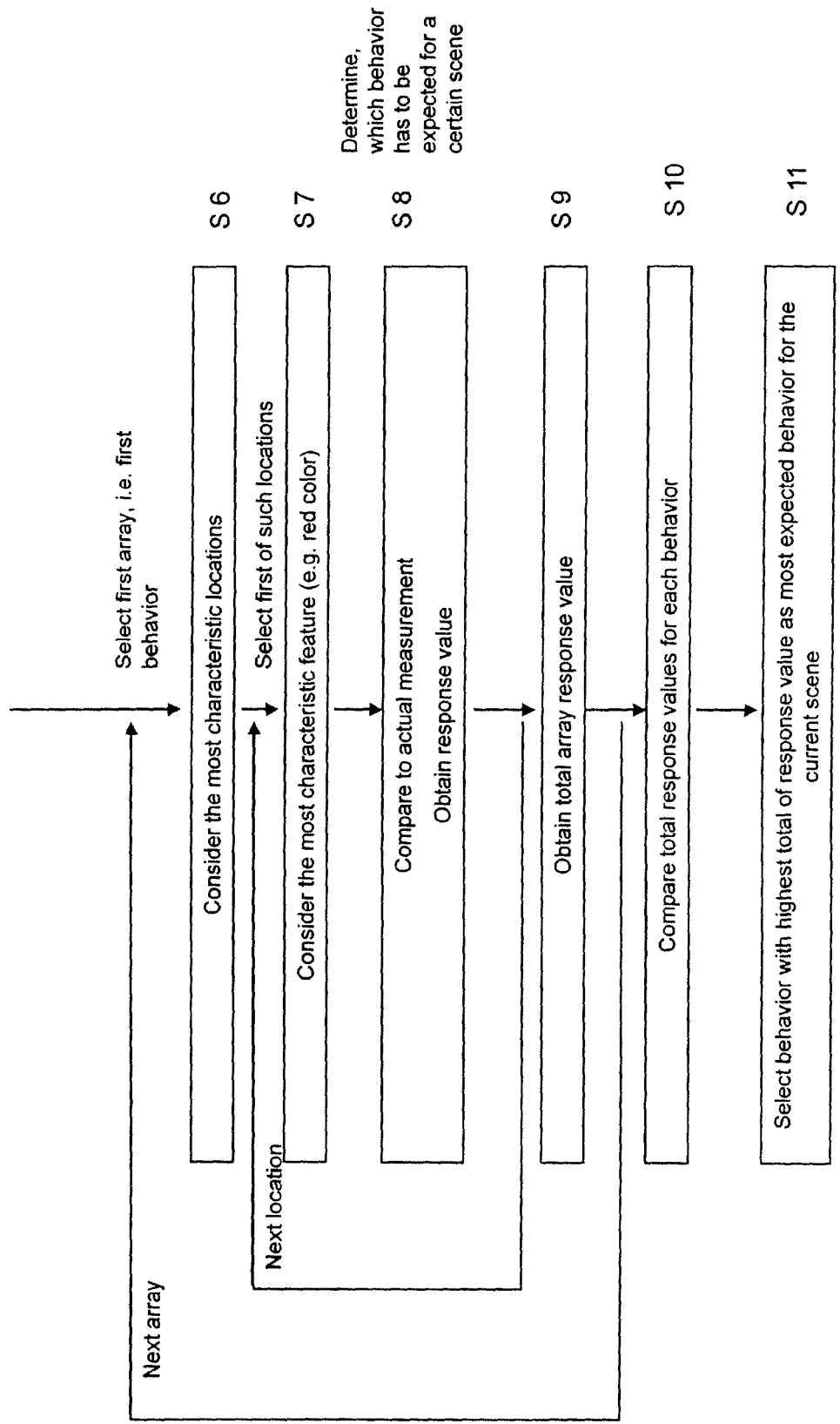

The signal processing process according to the present invention will now be explained with reference to the flow-chart of FIGS. 5a and 5b.

As a first step S1, the computing unit segments each input stream into a sequence of sub-streams such that each sub-stream corresponds to a certain type of behavior of the driver, as sensed by the sensor already mentioned. The types of behavior considered here are e.g. "deceleration", "acceleration", "turning left" and "turning right".

Consequently, the segmentation is performed on the basis of the bus data, by applying thresholds to the velocity and the yaw rate that define these types of behavior (see FIG. 1).

More fine-grained types can be provided by sub-dividing these basic types (e.g., "slight deceleration" and "strong deceleration"). Note that these types of behavior actually correspond to changes in the state of the vehicle, induced by the driver's behavior. The underlying assumption is that the driver changes his/her behavior for a certain reason, namely, because he/she is reacting to something in the visual scene that requires or suggests such a change. The images corresponding to each of the sub-streams resulting from the segmentation are therefore likely to depict what the driver has reacted to, i.e., they are likely to contain some information that is behavior-relevant, as opposed to the other images that apparently do not depict anything of sufficient importance to affect the behavior of the driver.

Thus, in step S2 e.g. four sets of images are present, where each set consists of all images that correspond to a certain type of behavior, and a fifth set that contains all other images.

Figure 2:
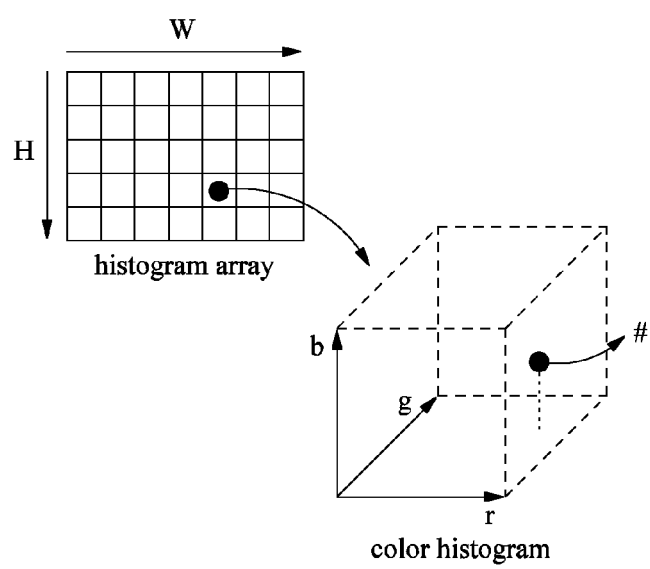
FIG. 2 shows a two-dimensional array of local color histograms, as produced and stored by a computing unit according to the invention.

In order to determine for each of the image sets that correspond to a certain type of behavior what the behavior-relevant information is, each of them is compared to the fifth image set. Visual information that frequently occurs while the system senses that the driver performs a certain type of behavior, but only rarely occurs when the driver does not, is characteristic of this type of behavior and likely to be relevant, as opposed to visual information that occurs to a similar extent in either case. In order to be able to compare the image sets in a systematic way, each image set is represented in step S3 by a two-dimensional array of local feature histograms (see FIG. 2): The two-dimensional array spans the entire width and height of the images and, at each location, contains a histogram that keeps record of how often a certain feature has been observed at that location, throughout the entire image set. To be more exact, it is the number of sub-streams in which it has been observed, not the number of images themselves that is counted, i.e., visual information that corresponds to the same sub-stream is treated as one because it refers to the same situation. If more than one visual cue is considered, such as color, disparity and oriented edges, for example, then each visual cue has its own two-dimensional array of histograms. Considering color with respect to RGB color space as the only visual cue here, we thus end up with a single two-dimensional array of local color histograms per image set. Here, the most fine-grained level of granularity possible for the resolution of the array has been chosen, i.e., each image pixel has its own (color) histogram.

Figure 3:
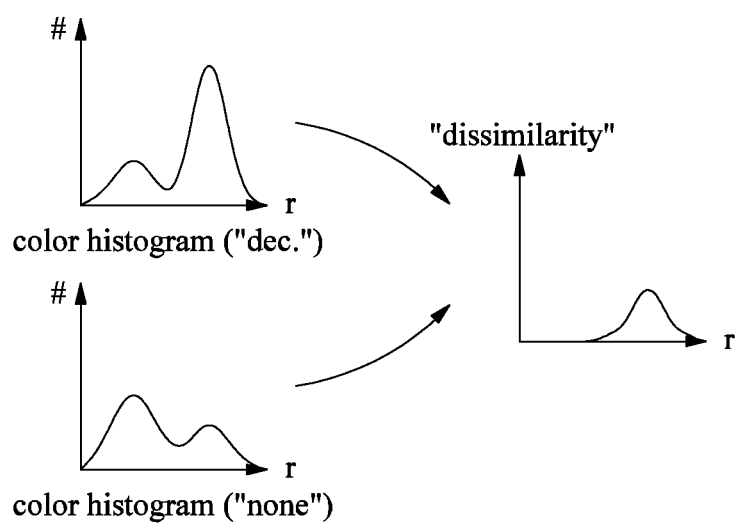
FIG. 3 shows a comparison between two local color histograms.

The advantage of representing the image sets by histogram arrays is that they can be easily compared to each other while at the same time preserving all information about the different features that have been observed and their corresponding locations in the visual field. By comparing the histogram array of an image set that corresponds to a certain type of behavior to the histogram array of the fifth image set in steps S4 and S5, the system is therefore able to determine which are the most characteristic locations in the visual field and, for each location, which is the most characteristic feature that has been observed. For example, by comparing the histogram array of the image set that corresponds to deceleration behavior to the histogram array of the fifth image set, the system can find out that—amongst others—red colors in the upper right area of the visual field are characteristic of deceleration behavior, without knowing anything about red traffic lights in advance. In order to determine the most characteristic feature at a certain location, the system compares in step S4 the corresponding local histogram of the histogram array to the corresponding local histogram of the fifth histogram array as follows:

For each color in the first local histogram, it computes how dissimilar it is with respect to the colors in the other local histogram, taking into account both their distances in color space as well as their respective number of occurrence (see FIG. 3). The color that has the highest dissimilarity value thus obtained is taken in step S4 as the most characteristic feature at that location. The most characteristic locations in the visual field are determined in S5 in a similar way: For each location, the system again compares the corresponding local histograms and computes the dissimilarity value for each color, but instead of taking the maximum it computes their sum, ranging over all colors, which is a measure of how dissimilar the local histograms are as a whole. As a result, we end up with an image where each pixel is assigned the sum of dissimilarity values that have been computed at this location, which represents how characteristic this location is, and another image where each pixel is assigned the color that has been determined as the most characteristic feature at this location.

When the system has learned which features and locations are most characteristic of the different types of behavior, it utilizes this knowledge to derive expectations about the appropriate behavior in a given visual scene. In order to achieve this, the image representing how characteristic the different locations are, is thresholded in step S6 (FIG. 5b) such that the most characteristic locations remain while locations that are less characteristic are suppressed. For each of the characteristic locations, the system then considers in S7 the most characteristic color at that location, as represented by the image containing the most characteristic features, and a fixed local neighborhood. By computing the degree of similarity between the color currently observed in the given visual scene at each of the local neighborhood pixels and the most characteristic color, based on their distance in color space, and taking the highest similarity value thus computed as response value at the location considered, a response image is obtained in step S8. By adding up all response values in S9 across the entire visual field, the system is able to estimate how much the given visual scene matches the characteristics of a certain type of behavior. If this procedure is done for all four types of behavior considered here, this results in S10 in four sums of response values, one for each type of behavior. The behavior with the highest sum of response values is then taken in S11 as the behavior that the system expects to be most appropriate in the given visual scene. The expected behavior can then be compared to the actual behavior of the driver, e.g., by reading the CAN bus data, or autonomously initiated by the system by directly controlling the effectors of the car. Preferably, in order to achieve a reliable performance, several visual cues should be taken into account, not only color.

ASPECTS OF THE INVENTION

1. One aspect of the invention consists in the way the system learns which aspects of the vast amount of information acquired by the sensors are relevant for driving a car and which are not. Unlike existing approaches in computer vision and related research areas, the system avoids to directly analyze this information without taking into account the behavioral context. Instead, it utilizes the observed behavior of the human driver to impose structure on the sensor information, thereby breaking down its complexity in an optimal way such that the aspects of the sensor information which are relevant for a certain behavior of the driver can be obtained as the statistically significant differences between the sensor information that is acquired while the driver performs this behavior and the sensor information that is acquired when he/she does not.

2. The system uses two-dimensional arrays of local feature histograms in order to collect, represent and compare the sensor information that is acquired while the driver performs a certain behavior and the sensor information that is acquired when he/she does not. If visual features of different types are considered by the system (e.g., color, disparity and oriented edges), each of them has its own histogram arrays.

3. The system, based on the relevant aspects of the sensor information that it has learned for the different behaviors of the driver, uses this knowledge to derive expectations about the appropriate behavior given a visual scene.

4. The system compares these expectations to the actual behavior of the driver, e.g., by reading the CAN bus data, and provides a warning signal in case of significant deviation.

5. The system autonomously initiates the behavior that, according to its expectations, is the most appropriate in a given visual scene by directly controlling the effectors of the car.

APPLICATION AREAS

The invention is intended to be used for driver assistance systems and autonomous driving applications.

GLOSSARY

Behaviors (of the driver): braking, accelerating, steering left and steering right
CAN bus (of the car): interface that provides car data such as velocity, steering angle, . . .
Computer vision: see http://en.wikipedia.org/wiki/Computer vision
Disparity: see http://en.wikipedia.org/wiki/Binocular disparity
Histograms: see "http://en.wikipedia.org/wiki/Histogram"
Locations (in the visual field): in our case, each image pixel represents a location
Machine learning: see http://en.wikipedia.org/wiki/Machine learning
RGB color space: see "http://en.wikipedia.org/wiki/RGB_color_space"Tasks (in driver assistance systems): keep the lane, avoid collision with car in front, . . .
Visual cues: color, disparity, oriented edges and the like as general concepts
Visual features: concrete colors, disparity values, oriented edges and the like in an image

PRIOR ART LIST

[1]: Mori et al., "Vehicle and lane recognizing device", patent JP2007004669 (A)
[2]: Kamimura et al., "Safety device for vehicle", patent JP6270780 (A)
[3]: Breuer et al., "Driver assist system", patent EP2077212 (A1)
[4]: Iwama et al., "Vehicle periphery monitoring device", patent JP2007018142 (A)
[5]: Shimizu et al., "Braking control device", patent JP2008044520 (A)

[6]: Jeon, "Anti-lock brake system control device . . . ", patent KR20050006760 (A)
[7]: Shelton et al., "Vehicle collision prevention system . . . ", patent GB2394076 (A)
[8]: Hanusch, "Electronic vehicle anti-collision system", patent DE19648826 (A1)
[9]: Izumi et al., "Attitude control device for vehicle", patent JP10264795 (A)
[10]: Yoshioka et al., "Moving object identifying device . . . ", patent JP10100820 (A)
[11]: Mochizuki, "Obstacle detection device for vehicle", patent JP2005231450 (A)
[12]: Mullen, "Driver emulative vehicle control system", patent U.S. Pat. No. 5,684,697 (A)
[13]: Lohner et al., "Automatic following guidance system . . . ", U.S. Pat. No. 6,370,471 (B1)
[14]: Yang, "Automatic driving system of vehicle", patent CN1218355 (A)
[15]: Lang et al., "Means of transport with a three-dim . . . ", patent WO20040221546 (A2)

We claim:

1. A computer-implemented method for setting-up and operating a driver assistance system,
the method comprising the steps of:
   visually sensing an environment of a vehicle,
   sensing at least one rate of change of a parameter representing a status of the vehicle, which the parameter can be influenced by a driver manipulating a man/machine interface of the vehicle,
   structuring information gathered by the visual sensing by classifying the at least one sensed rate of change in different categories, in order to find visual features associated to a certain category of sensed rate of change and thus associated with a certain behavior of the driver,
characterized in that
   the step of structuring comprises splitting the visually sensed data stream in at least two categories of the at least one sensed rate of change,
   preparing a histogram indicating how frequent a visual feature out of a set of different visual features occurred while the sensed rate of change indicated an occurrence of a category of a driver's behavior, wherein
   the set of different visual features is gained by comparing the split visually sensed data streams for the categories exceeding a threshold value with a data stream portion of time periods during which the threshold values were not reached or with another data stream or data stream portion.

2. The method according to claim 1, wherein, as a function of the structured information, a visual or acoustical signal is generated, or an effector of the vehicle is operated.

3. The method according to claim 1, wherein the
   at least one sensed rate of change comprises, "turning left", "turning right" or "accelerating".

4. The method according to claim 1, wherein one additional category is provided for portions of the visually sensed data stream in time period during which no sensed rate of change was present or did not exceeded a predefined threshold value.

5. A computing unit, designed to carry out a method according to claim 1.

6. A driver assistance system, equipped with a computing unit according to claim 5, furthermore comprising visual or acoustical indicating means, and/or an interface for supplying control commands to at least one effector of the vehicle.

7. A computer software program product, performing a method according to claim 1 when run on a computing device.

8. A land, sea or air vehicle, comprising a driver assistance system according to claim 6.

9. An autonomous robot, comprising a driver assistance system according to claim 6.

10. The method according to claim 2, wherein the effector of the vehicle comprises at least one of a steering wheel, an accelerator, or a brake.

11. The method according to claim 3, wherein the sensed rate of change exceeds a predefined threshold value.

* * * * *